United States Patent
Hsu

(10) Patent No.: US 9,178,667 B2
(45) Date of Patent: Nov. 3, 2015

(54) METHOD AND APPARATUS FOR IMPROVING A SEMI-PERSISTENT SCHEDULING RESOURCE RELEASE PROCESS IN A WIRELESS COMMUNICATION SYSTEM

(75) Inventor: Chia-Chun Hsu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 1188 days.

(21) Appl. No.: 12/611,936

(22) Filed: Nov. 4, 2009

(65) Prior Publication Data

US 2010/0111026 A1 May 6, 2010

Related U.S. Application Data

(60) Provisional application No. 61/110,994, filed on Nov. 4, 2008, provisional application No. 61/120,493, filed on Dec. 8, 2008.

(51) Int. Cl.
*H04L 1/18* (2006.01)
*H04W 72/04* (2009.01)
*H04W 76/06* (2009.01)
*H04W 72/12* (2009.01)

(52) U.S. Cl.
CPC .......... *H04L 1/1893* (2013.01); *H04W 72/0413* (2013.01); *H04L 1/1812* (2013.01); *H04W 72/042* (2013.01); *H04W 72/12* (2013.01); *H04W 76/06* (2013.01)

(58) Field of Classification Search
CPC ............ H04W 72/042; H04W 76/066; H04W 72/0413; H04W 76/06; H04W 72/12; H04L 1/1893; H04L 1/1812
USPC .......................... 370/328, 329, 338, 341, 437
See application file for complete search history.

(56) References Cited

U.S. PATENT DOCUMENTS

| | | | | |
|---|---|---|---|---|
| 8,175,050 B2 * | 5/2012 | Meylan | .......................... | 370/329 |
| 8,625,486 B2 * | 1/2014 | Wang et al. | .................... | 370/328 |
| 2010/0067457 A1 * | 3/2010 | Wang et al. | .................... | 370/329 |
| 2011/0002262 A1 * | 1/2011 | Wang et al. | .................... | 370/328 |

OTHER PUBLICATIONS

QUALCOMM Europe: "Release of semi-persistent resources", 3GPP TSG-RAN WG2 meeting #62, R2-082500 (was R2-081828), May 5-9, 2008, pp. 1-2, XP050140182, Kansas City, USA.
Email Rapporteur: "Summary of the email discussion on remaining issues on Semi Persistent Scheduling", 3GPP TSG-RAN WG2 #63, R2-083900, Aug. 18-22, 2008, pp. 1-5, XP050319091, Jeju, Korea.
NTT Docomo, Inc.: "UL semi-persistent resource deactivation", 3GPP TSG RAN WG2 #62, R2-082483 (resubmission of R2-081859), May 5-May 9, 2008, XP050140167, Kansas City, USA.
3GPP, 3GPP TS 36.321 v8.3.0 MAC specification, 200809.
3GPP, 3GPP TS 36.331 v8.3.0 RRC specification, 200809.
3GPP, 3GPP TSG-RAN2#63bis R2-085070, 200809.
3GPP, 3GPP TSG-RAN2#63bis R2-085071, 200809.
3GPP, 3GPP TS 36.300 v8.6.0 Overall description, 200809.
3GPP, 3GPP TSG-RAN2#64bis R2-087024, 200810.
3GPP, 3GPP TSG-RAN2#64bis R2-086091, 200809.

* cited by examiner

*Primary Examiner* — Christopher Grey
(74) *Attorney, Agent, or Firm* — Winston Hsu; Scott Margo

(57) ABSTRACT

A method of improving a semi-persistent scheduling (SPS) resource release process for a medium access control (MAC) layer of a user equipment in a wireless communication system includes deactivating allocated SPS resources when receiving an SPS resource release command and transmitting a MAC control element including an SPS resource release confirmation for confirming SPS resource deactivation.

18 Claims, 5 Drawing Sheets

| Index | LCID values |
|---|---|
| 00000 | CCCH |
| 00001-01010 | Identity of the logical channel |
| 01011-11001 | Reserved |
| 11010 | Power Headroom Report |
| 11011 | C-RNTI |
| 11100 | Truncated BSR |
| 11101 | Short BSR |
| 11110 | Long BSR |
| 11111 | Padding |

FIG. 5

METHOD AND APPARATUS FOR IMPROVING A SEMI-PERSISTENT SCHEDULING RESOURCE RELEASE PROCESS IN A WIRELESS COMMUNICATION SYSTEM

CROSS REFERENCE TO RELATED APPLICATIONS

This application claims the benefit of U.S. Provisional Application No. 61/110,994, filed on Nov. 4, 2008 and entitled "METHOD AND APPARATUS FOR IMPROVING SEMI-PERSISTENT SCHEDULING RELEASE PROCESS IN A WIRELESS COMMUNICATIONS SYSTEM", and the benefit of U.S. Provisional Application No. 61/120,493, filed on Dec. 8, 2008 and entitled "METHOD AND APPARATUS FOR HANDLING SEMI-PERSISTENT SCHEDULING RELEASE IN A WIRELESS COMMUNICATIONS SYSTEM", the contents of which are incorporated herein.

BACKGROUND OF THE INVENTION

1. Field of the Invention

The present invention relates to a method and related communication device in a wireless communication system for improving a semi-persistent scheduling (SPS) resource release process, and more particularly, to a method and related communication device for improving the reliability of acknowledgement responding to a SPS resource release command.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The radio protocol stacks of E-UTRAN is given including a radio resource control layer (RRC), a packet data convergence protocol layer (PDCP), a radio link control layer (RLC), a media access control layer (MAC), and a physical layer (PHY).

A dynamic scheduling function is used in MAC for utilizing shared channel (SCH) resources. When sharing resources between UEs, MAC in eNB dynamically allocates physical layer resources for the downlink (DL)-SCH and uplink (UL)-SCH depends on the traffic volume, the Quality of Service (QoS) requirements of each UE, and associated radio bearers. In order to utilize SCH resources more efficiently, a semi-persistent scheduling (SPS) function is introduced in the LTE system and is used in MAC, for serving upper layer applications which generates semi-static size data periodically, e.g. VoIP services. The eNB activates SPS resource by sending a physical downlink control channel (PDCCH) signaling. According to current specification, a UE reply for SPS resource activation is not necessary.

There are two error cases in SPS resource activation. One is false activation that the eNB activates SPS resource on a UE which is not a target UE, which may result in SPS resources interference when the same SPS resource is also activated on the target UE. Current specification defines virtual cyclic redundancy check (CRC) in PDCCH to prevent SPS resources interference caused by the harmful false activation. The other is failure activation that the eNB does not activate SPS resource on the target UE successfully. It is not a considerable concern since there is no potential interference between UEs. The eNB can find out the failure activation at the coming SPS resource and activate SPS resource again.

Similar to SPS resource activation, SPS resource release is also done by an explicit PDCCH signaling including an SPS cell radio network temporary identifier (C-RNTI). According to previous specification, the eNB does not require waiting for a UE reply for SPS resource release. It is a different story for error cases of SPS resource release, however. One is false release that the eNB releases SPS resource on the UE by mistake, which does not result in harmful SPS resources interference and the eNB can activate SPS resource on the UE again if the eNB likes to do so. The other is failure release that the eNB transmits an SPS resource release command to the UE while the UE fails to receive the SPS resource release command and still uses SPS resources previously assigned. If the eNB reassigns SPS resources prematurely to another UE without waiting for any confirmation responding to the SPS resource release command from the UE, SPS resources interference between UEs may happen. For UL SPS, the UE keeps transmitting on revoked SPS resources and interferes with the transmission of another UE which currently owns SPS resources. For DL SPS, the UE keeps receiving on revoked SPS resources but cannot decode transport blocks correctly since the data is for another UE, and as a result, a corresponding negative-acknowledgement (NACK) transmitted by the UE probably collides with the ACK/NACK of the current owner.

Duo to poor reliability of the PDCCH signaling, the eNB is not confident that the UE indeed receives the PDCCH signaling of SPS resource release, and SPS resources interference caused by failure SPS resource release may happen. In order to prevent the potential interference, for UL case, the eNB reuses SPS resources after waiting and seeing nothing sent from the UE on the next UL SPS resource; and for DL case, the eNB reuses SPS resources after waiting and seeing no corresponding ACK/NACK sent from the UE with respect to the next DL SPS resource. The above solution is also called implicit release, which costs the eNB extra time on waiting.

For improving SPS resource release, the 3GPP further defines that the UE has to confirm DL SPS resource release by replying a physical uplink control channel (PUCCH) ACK, which is more efficient than the eNB waiting and seeing if no data on the next SPS resource. The eNB sends an SPS resource release PDCCH signaling at subframe n which implicitly defined PUCCH resource at subframe (n+4) for the UE to response a PUCCH ACK if the release is successful, therefore, the eNB can safely reassign SPS resource to another UE. However, the PUCCH ACK is error-prone and its reliability is around $10^{-1} \sim 10^{-2}$. Presently, the PUCCH ACK reply is only for DL SPS resource release. Whether the eNB can reuse SPS resources directly after receiving the PUCCH ACK is questionable.

SUMMARY OF THE INVENTION

The present invention therefore provides a method and related communication device for improving an SPS resource release process for a MAC layer of a UE in a wireless communication system.

The present invention discloses a method of improving an SPS resource release process for a MAC layer of a UE in a wireless communication system. The method includes deactivating allocated SPS resources when receiving an SPS resource release command and transmitting a MAC control element including an SPS resource release confirmation for confirming SPS resource deactivation.

The present invention further discloses a communication device of a wireless communication system for improving an SPS resource release process. The communication device includes a computer readable recording medium, for storing program code corresponding to a process, and a processor that is coupled to the computer readable recording medium and is used for processing the program code to execute the process. The process includes deactivating allocated SPS resources when receiving an SPS resource release command and transmitting a MAC control element including an SPS resource release confirmation for confirming SPS resource deactivation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a table of value of the LCID according to the 3GPP 36.321 MAC specification.

DETAILED DESCRIPTION

Figure 1:
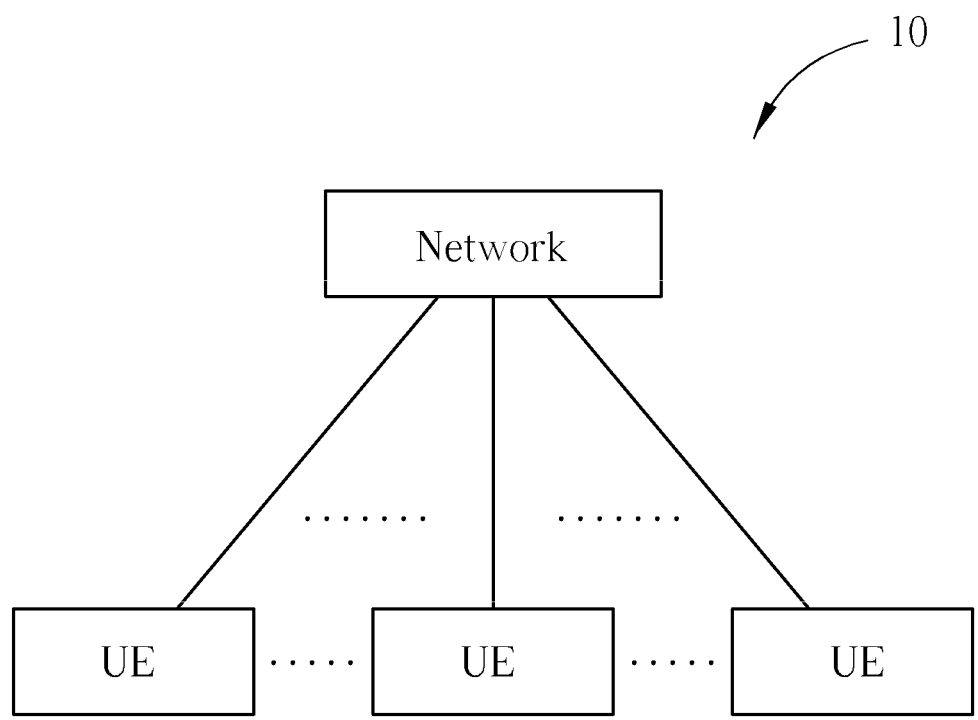
FIG. 1 is a schematic diagram of a wireless communication system.

Please refer to FIG. 1, which is a schematic diagram of a wireless communication system 10 according to an example of the present invention. The wireless communication system 10 can be a long-term evolution (LTE) system or other mobile communication systems, and is briefly composed of a network and a plurality of user equipments (UEs), as the structure illustrated in FIG. 1. In the LTE system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 2:
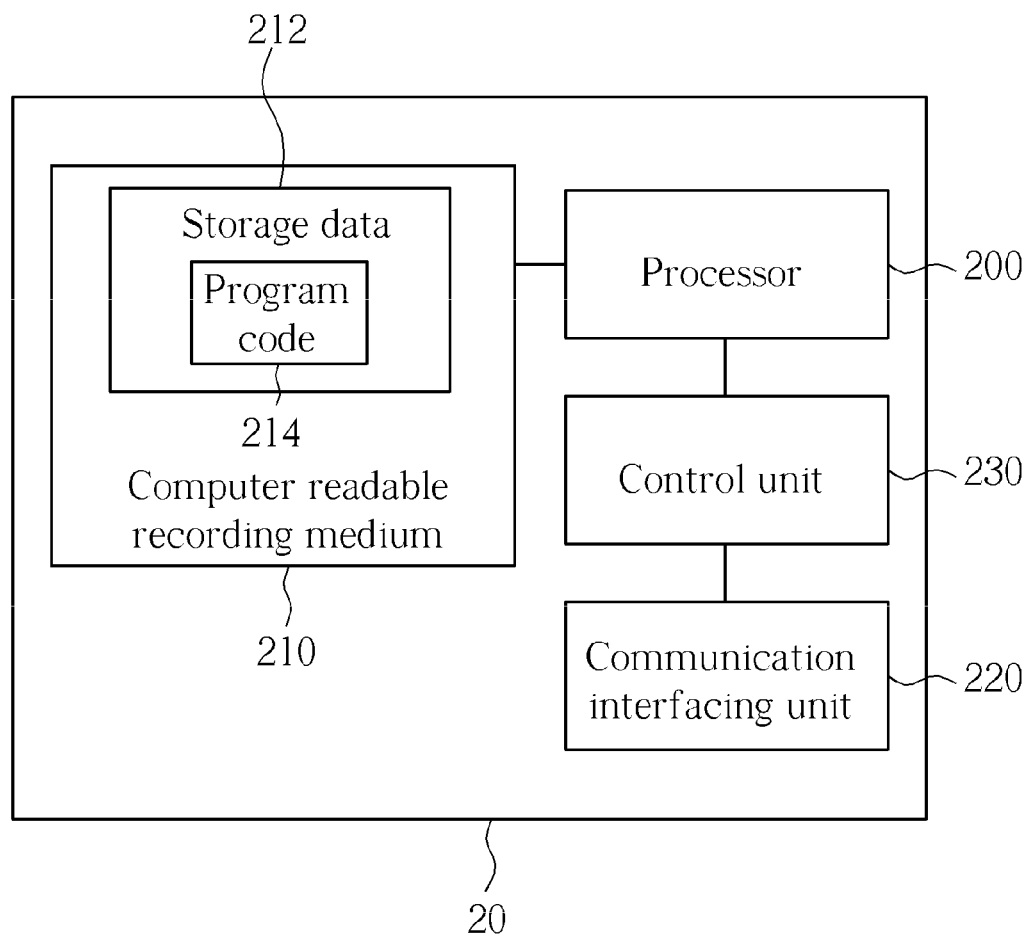
FIG. 2 is a schematic diagram of a communication device according to an example of the present invention.

Please refer to FIG. 2, which is a schematic diagram of a communication device 20 according to an example of the present invention. The communication device 20 can be a UE shown in FIG. 1 and includes a processor 200, a computer readable recording medium 210, a communication interfacing unit 220 and a control unit 230. The computer readable recording medium 210 is any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, floppy disks, optical data storage devices, and carrier waves (such as data transmission through the Internet). The control unit 230 controls the communication interfacing unit 220 and related operations and states of the communication device 20 according to processing results of the process 200. The communication interfacing unit 220 is preferably a radio transceiver for wirelessly communicating with the network.

Figure 3:
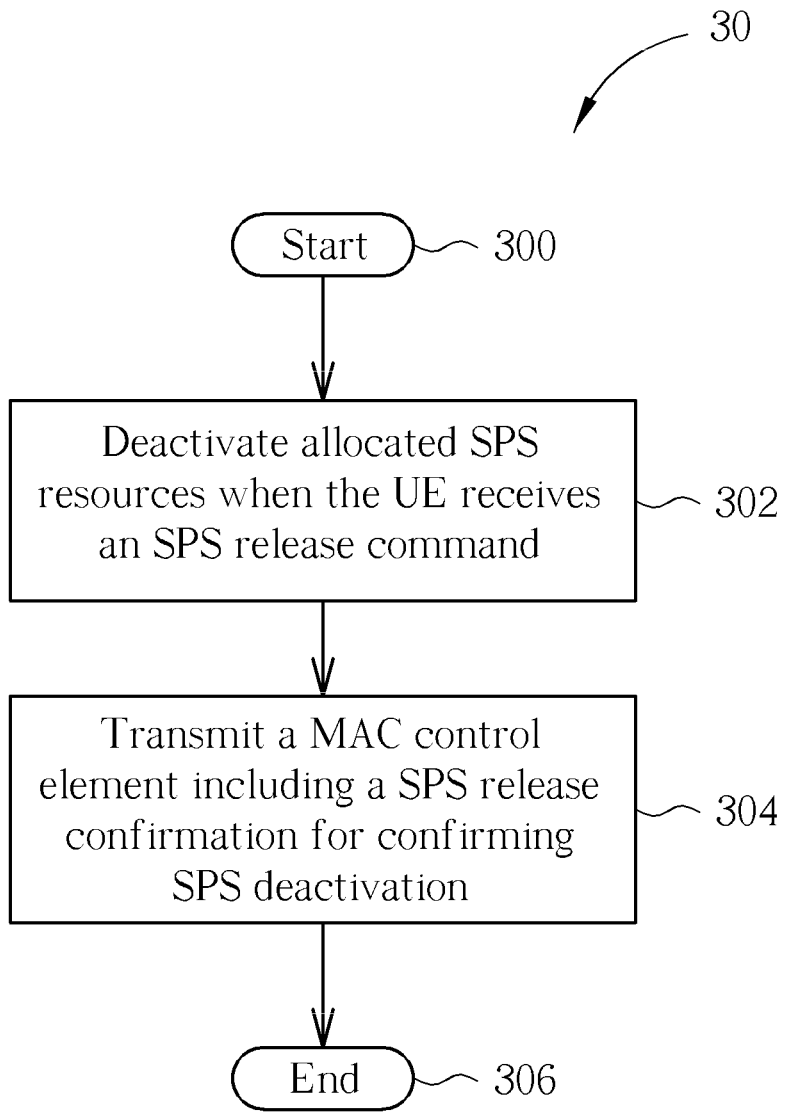
FIG. 3 is a flowchart of a process according to an example of the present invention.

From the mentioned prior art, it is known that when or how fast the eNB can reuse semi-persistent scheduling (SPS) resources relies on when the eNB is confident that SPS resources have been released on the UE side, and also, the UE should release SPS resources before the eNB does for preventing resources interference caused by failure SPS resource release. Please refer to FIG. 3, which is a flowchart of a process 30 according to an example of the present invention. The process 30 is utilized for improving an SPS resource release process for a medium access control (MAC) layer of a UE in the wireless communication system 10 and can be compiled into the program code 214. The process 30 includes the following steps:

Step 300: Start.

Step 302: Deactivate allocated SPS resources when the UE receives an SPS resource release command.

Step 304: Transmit a MAC control element including a SPS resource release confirmation for confirming SPS resource deactivation.

Step 306: End.

The SPS resource release command is a physical downlink control channel (PDCCH) signaling sent from the eNB to inform SPS resource release, including UL and DL SPS resource release. According to the process 30, when receiving an SPS resource release PDCCH signaling, the UE deactivates allocated SPS resources and transmits a MAC control element (CE) including an SPS resource release confirmation, called SPS resource release MAC CE hereinafter, as a reply to the SPS resource release PDCCH signaling to the eNB, for confirming SPS resource deactivation. Note that, the SPS resource release MAC CE is used for UL SPS resource release and DL SPS resource release by different formats and contents, which is defined by the present invention and is described in detail later. The reliability of a MAC CE is around $10^{-3}$, which is much better than the reliability of a PUCCH ACK, around $10^{-1} \sim 10^{-2}$ according to the prior art.

In the prior art, for UL SPS case, the PUCCH ACK for SPS resource release is not used, and the eNB needs to detect if there is no UL data in the next SPS resource to confirm SPS resource release. For DL SPS case, due to poor reliability of the PUCCH ACK, it is questionable if the eNB can reuse SPS resources directly after receiving the PUCCK ACK, and besides, the UE has to detect several consecutive unused SPS resources to confirm SPS resource release. In this situation, failure SPS resource release easily happens and results in SPS resources interference between UEs. In comparison, through the process 30, the UE transmits the SPS resource release MAC CE to confirm SPS resource deactivation instead of transmitting the PUCCK ACK, in other words, the UE can initiate the SPS resource release process. The higher reliability of the MAC CE keeps the UE from the failure SPS resource release, so that the eNB can release SPS resource resources and reassign SPS resources to another UE after the SPS resource release MAC CE is successfully received. The present invention provides another example that when the serving eNB can handle the increasing complexity, the UE both transmits the SPS resource release MAC CE and the PUCCH ACK as the reply to the SPS resource release PDCCH signaling, for improving delay and the reliability issue.

There are other advantages in addition to higher reliability. The SPS resource release MAC CE is inserted to a transport block for transmission. Once the transmission of the transport block including the SPS resource release MAC CE fails, the SPS resource release MAC CE has opportunities to be retransmitted by using a hybrid automatic repeat request (HARQ) mechanism but PUCCH ACK does not. In addition, the feedback delay (which is a time between an explicit SPS resource release PDCCH signaling and a PUCCH ACK feedback) of a MAC CE is less than that of a PUCCH ACK if the eNB decides to grant an UL resource for the MAC CE right after the explicit SPS resource release PDCCH signaling.

Besides the process 30 that the UE transmits the SPS resource release MAC CE to confirm SPS resource deactivation, the present invention further defines which UL resource the SPS resource release MAC CE is transmitted on. One of examples of the present invention is to transmit the SPS resource release MAC CE only on an UL resource assigned to a transport block including the SPS resource release MAC CE. In other words, when any other UL resource, whether it is an SPS resource or a new UL resource which is not assigned to the transport block including the SPS resource release MAC CE, arrives before an HARQ process of the transport block is completed or before the first transmission of the transport block, the UE doe not transmit the SPS resource release MAC CE on the arriving SPS resource or new UL resource and just ignores it.

Figure 4:
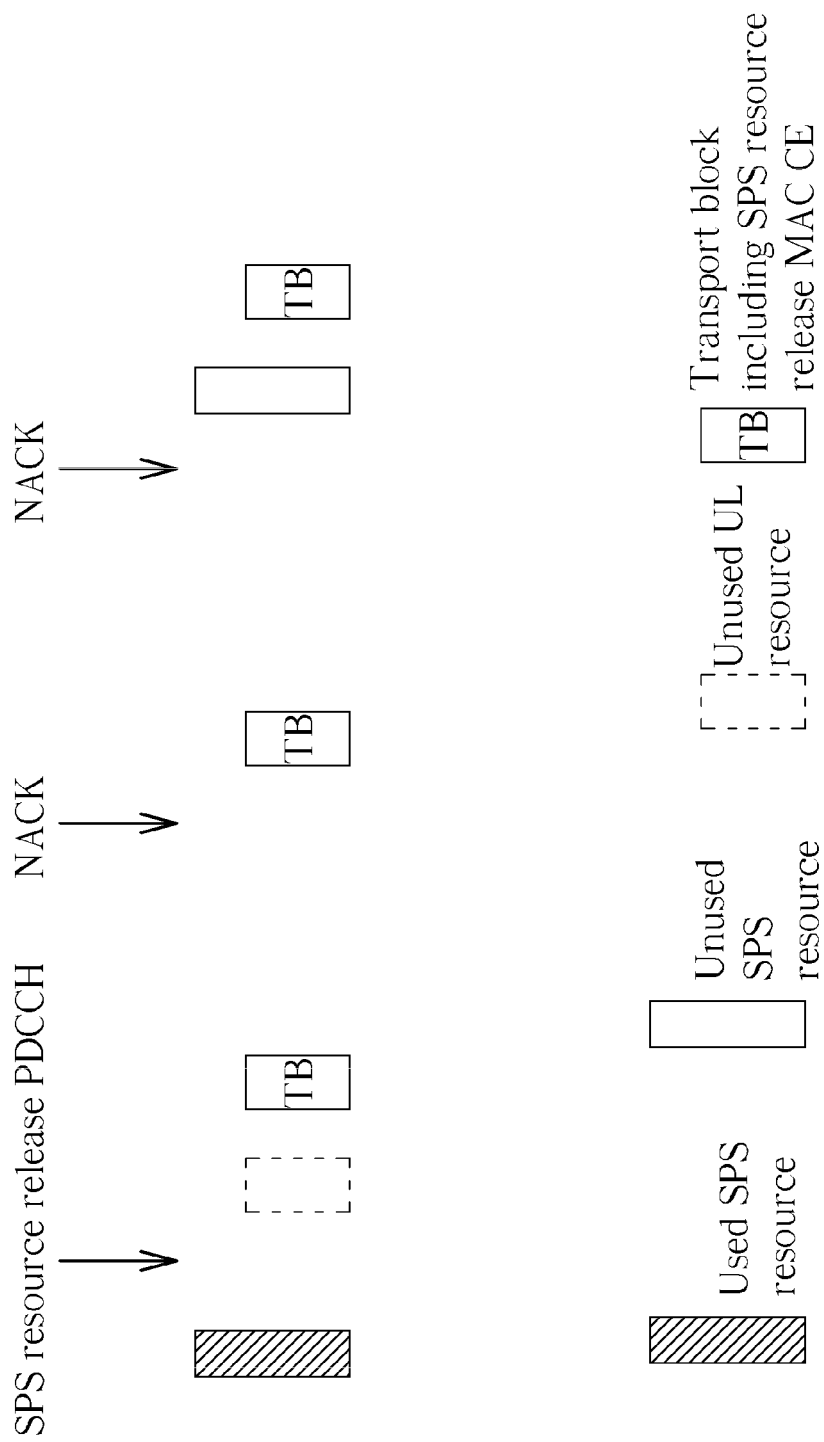
FIG. 4 is a timing diagram illustrating an SPS resource release process according to the process in FIG. 3.

Please refer to FIG. 4, which is a timing diagram illustrating the SPS resource release process according to the process 30. In FIG. 4, after receiving the SPS resource release PDCCH signaling, the UE deactivates allocated SPS resources. When a new UL resource arrives before the first transmission of a transport block including the SPS resource release MAC CE, denoted by TB, the UE ignores the new UL resource. However, the eNB fails to receive the first transmission of the transport block and even fails to receive subsequent retransmissions of the transport block. During the HARQ process, the transport block is only transmitted (and retransmitted) on the UL resources assigned to the transport block, and the SPS resource during the HARQ process is ignored and left empty. It is reasonable that the UE should not use the coming SPS resources in this situation because the eNB has sent the SPS resource release PDCCH signaling already. The eNB can detect there is an SPS resource empty and recognize that the UE deactivates SPS resources.

On the contrary, when the SPS resource release MAC CE is not limited to be transmitted only on the assigned UL resources, the present invention provides another two examples based on the process 30, for defining which UL resource the SPS resource release MAC CE is transmitted. One example is the UE transmits the transport block including the SPS resource release MAC CE on an SPS resource when the SPS resource arrives before the HARQ process of the transport block is completed. Another example is the UE transmits the transport block including the SPS resource release MAC CE on an UL resource when the UL resource arrives before the first transmission of the transport block. For example, there is an SPS resource release PDCCH signaling in the subframe n, in which the eNB assigns an UL grant for the UE to transmit the SPS resource release MAC CE at the subframe (n+4) to confirm SPS resource deactivation, and when there is an UL resource for new transmission arriving earlier than the subframe (n+4), the UE transmits the SPS resource release MAC CE on the earlier-arriving UL resource. Through the above two examples, the eNB can receive the SPS resource release MAC CE as soon as possible and reuse SPS resources more efficiently.

As mentioned previously, the SPS resource release MAC CE is used for UL SPS resource release and DL SPS resource release by different formats and contents. The SPS resource release confirmation included in the SPS resource release MAC CE should be able to inform the eNB of two things, which UE releases SPS resources and whether the SPS resources are for UL or for DL. The present invention uses a radio network temporary identifier (RNTI), which is two-byte long, for the SPS resource release confirmation. Precisely, a Cell-RNTI (C-RNTI) or an SPS C-RNTI is used. Also, a new logical channel Identification (LCID) is assigned to the SPS resource release MAC CE, which allows the eNB to recognize the new MAC CE. Please refer to the FIG. 5, which is a table of value of the LCID according to the 3GPP 36.321 MAC specification v.8.3.0. The SPS resource release MAC CE can be assigned from the reserved range shown in FIG. 5.

Two different SPS resource release MAC CE are given as follows. One is a one-byte long SPS resource release MAC CE, corresponding to one UL-SCH MAC subheader LCID. The one-byte long SPS resource release MAC CE comprises half an SPS C-RNTI or half a C-RNTI of the UE. Which half the SPS C-RNTI or C-RNTI the one-byte long SPS resource release MAC CE comprises depends on whether the SPS resource release PDCCH signaling is for UL SPS resource release or for DL SPS resource release. For example, when the received SPS resource release PDCCH signaling is for UL SPS resource release, the corresponding SPS resource release MAC CE comprises the first byte (or said the most significant byte) of the SPS C-RNTI (or C-RNTI). When the received SPS resource release PDCCH signaling is for DL SPS resource release, the corresponding SPS resource release MAC CE comprises the second byte (or said the least significant byte) of the SPS C-RNTI (or C-RNTI). The other is a two-byte long SPS resource release MAC CE, corresponding to two UL-SCH MAC subheader LCIDs, one for UL SPS resource release and the other for DL SPS resource release. The two-byte long SPS resource release MAC CE comprises a whole SPS C-RNTI or a whole C-RNTI. Since the SPS resource release MAC CE does not occupy an entire UL resource, the UE needs only a part of an UL resource to transmit the SPS resource release MAC CE.

In conclusion, the present invention defines a new MAC CE including SPS resource release confirmation, and after the UE deactivates allocated SPS resources according to the SPS resource release PDCCH signaling, the UE transmits the SPS resource release MAC CE instead of transmitting a PUCCK ACK, for confirming SPS resource deactivation. Benefit from the higher reliability of the MAC CE, SPS resources interferences caused by failure SPS resource release is eliminated and furthermore, the eNB can reuse SPS resource more efficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving a semi-persistent scheduling, abbreviated to SPS, resource release process for a medium access control (MAC) layer of a user equipment in a wireless communication system, the method comprising:
   deactivating allocated SPS resources when receiving an SPS resource release command; and
   transmitting a MAC control element including an SPS resource release confirmation for confirming SPS resource deactivation;
   wherein the MAC control element comprises half a radio network temporary identifier (RNTI) as the SPS resource release confirmation, and which half the RNTI the MAC control element comprises depends on whether the SPS resource release command is for uplink SPS resource release or for downlink SPS resource release.

2. The method of claim 1, wherein the step of transmitting the MAC control element including the SPS resource release confirmation for confirming SPS resource deactivation is transmitting the MAC control element only on an uplink resource assigned to a transport block including the MAC control element.

3. The method of claim 1, further comprising:
transmitting a transport block including the MAC control element on an SPS resource when the SPS resource arrives before an hybrid automatic repeat request (HARQ) process of the transport block is completed.

4. The method of claim 1, further comprising:
transmitting a transport block including the MAC control element on an uplink resource when the uplink resource arrives before the first transmission of the transport block.

5. The method of claim 1, further comprising:
transmitting a physical uplink control channel (PUCCH) acknowledgement for confirming SPS resource deactivation.

6. The method of claim 1, wherein the SPS resource release command is a physical downlink control channel (PDCCH) signaling.

7. The method of claim 1, wherein the RNTI is a cell-RNTI or an SPS cell-RNTI.

8. The method of claim 1, wherein the MAC control element comprises a radio network temporary identifier (RNTI) as the SPS resource release confirmation.

9. The method of claim 8, wherein the RNTI is a cell-RNTI or an SPS cell-RNTI.

10. A communication device of a wireless communication system for improving a semi-persistent scheduling, abbreviated to SPS, resource release process, the communication device comprising:
a non-transitory computer readable recording medium for storing program code corresponding to a process; and
a processor coupled to the non-transitory computer readable recording medium, for processing the program code to execute the process;
wherein the process comprises:
deactivating allocated SPS resources when receiving an SPS resource release command; and
transmitting a MAC control element including an SPS resource release confirmation for confirming SPS resource deactivation;
wherein the MAC control element comprises half a radio network temporary identifier (RNTI) as the SPS resource release confirmation, and which half the RNTI the MAC control element comprises depends on whether the SPS resource release command is for uplink SPS resource release or for downlink SPS resource release.

11. The communication device of claim 10, wherein the step of transmitting the MAC control element including the SPS resource release confirmation for confirming SPS resource deactivation in the process is transmitting the MAC control element only on an uplink resource assigned to a transport block including the MAC control element.

12. The communication device of claim 10, wherein the process further comprises transmitting a transport block including the MAC control element on an SPS resource when the SPS resource arrives before an hybrid automatic repeat request (HARQ) process of the transport block is completed.

13. The communication device of claim 10, wherein the process further comprises transmitting a transport block including the MAC control element on an uplink resource when the uplink resource arrives before the first transmission of the transport block.

14. The communication device of claim 10, wherein the process further comprises transmitting a physical uplink control channel (PUCCH) acknowledgement for confirming SPS resource deactivation.

15. The communication device of claim 10, wherein the SPS resource release command is a physical downlink control channel (PDCCH) signaling.

16. The communication device of claim 10, wherein the RNTI is a cell-RNTI or an SPS cell-RNTI.

17. The communication device of claim 10, wherein the MAC control element comprises a radio network temporary identifier (RNTI) as the SPS resource release confirmation.

18. The communication device of claim 17, wherein the RNTI is a cell-RNTI or an SPS cell-RNTI.

* * * * *